United States Patent [19]

McDonald et al.

[11] 4,265,835

[45] May 5, 1981

[54] CONVERSION OF CARBOXAMIDE TO N-SUBSTITUTED DERIVATIVE THEREOF USING CARBON MAGNETIC ANALYSIS

[75] Inventors: Charles J. McDonald, Midland, Mich.; Robert H. Beaver, Antioch, Calif.

[73] Assignee: The Dow Chemical Comapny, Midland, Mich.

[21] Appl. No.: 74,021

[22] Filed: Sep. 10, 1979

[51] Int. Cl.$^3$ .......................... C08F 8/30; C08F 8/32
[52] U.S. Cl. .................................. 564/204; 525/154; 525/157; 525/379; 564/208
[58] Field of Search .................. 525/379, 154, 157; 260/561 B, 561 K, 561 S, 583 R

[56] References Cited

U.S. PATENT DOCUMENTS

| 2,328,901 | 9/1943 | Grimm et al. | 525/336 |
| 3,439,260 | 4/1969 | Bene et al. | 324/0.5 |
| 3,862,091 | 1/1975 | Barabas et al. | 525/379 |
| 3,925,721 | 12/1975 | Petroff | 324/0.5 R |

OTHER PUBLICATIONS

"The Mannich Reaction of Polyacrylamide" McDonald et al., Macromolecules, vol. 12, p. 203 3-1979.

Primary Examiner—William F. Hamrock

[57] ABSTRACT

In a process for preparing a N-substituted derivative of a carboxamide, the conversion of carboxamide to the derivative is determined by carbon-13 nuclear magnetic resonance analysis (CMR) wherein the intensities of the carbonyl carbon peaks attributable to the carboxamide and the derivative are measured under conditions of magnetic resonance and the mole ratio of carboxamide to derivative is determined by comparing the intensities of said carbonyl carbon peaks.

For example, in the reaction of polyacrylamide with a secondary amine such as dimethylamine and formaldehyde, the conversion of the polyacrylamide to its N-(dimethylaminomethyl) derivative is determined by subjecting the sample to CMR analysis and comparing the intensities of the carbonyl carbon peaks of the polyacrylamide and the N-(dimethylaminomethyl) derivative.

11 Claims, No Drawings

CONVERSION OF CARBOXAMIDE TO N-SUBSTITUTED DERIVATIVE THEREOF USING CARBON MAGNETIC ANALYSIS

BACKGROUND OF THE INVENTION

This invention relates to a process for converting a carboxamide to a N-substituted derivative thereof, and particularly to a method for determining the conversion of said carboxamide to said derivative.

The Mannich reaction of carboxamides, particularly acrylamide or polymers thereof, with a lower aldehyde such as formaldehyde and a secondary amine such as dimethylamine to form a N-(aminoalkyl) derivative is well known. See U.S. Pat. Nos. 2,328,901; 3,256,140 and 3,539,535. As has been reported, this Mannich reaction involves the condensation of the carboximide, an aldehyde, usually formaldehyde, and a secondary amine. It is generally well accepted that the reaction normally involves the condensation of N-hydroxymethylamine or methylenediamine with the carboxamide containing a labile hydrogen under both acidic and basic conditions. While the mechanism and reaction kinetics for the Mannich reaction are reasonably well understood, it has not been a practice of the art to detect and control the conversion of the carboxamide to the desired Mannich derivative with any degree of accuracy. As a result, such reactions have generally been carried out in a somewhat haphazard and unpredictable fashion resulting in the formation of products which are inconsistent as to their conversion and purity. Such products are generally less efficient than theoretical calculations would indicate.

Accordingly, it would be highly desirable to provide a method for detecting and controlling the quantitative conversion of carboxamide to N-substituted derivative in order to produce optimum yields of an N-substituted derivative of more uniform product quality.

SUMMARY OF THE INVENTION

The present invention is such an improved process for preparing a N-substituted carboxamide from a carboxamide and a N-substituting reagent(s). Accordingly, the improvement comprises (a) subjecting a reaction mixture which contains the carboxamide, N-substituting reagent(s) and N-substituted derivative in a nuclear magnetic spectrometer to a constant magnetic field and an alternating electromagnetic field such that conditions of magnetic resonance are achieved for carbonyl carbon-13 nuclei in the reaction mixture; (b) detecting an output which is an indication of the disturbance of said fields by the reaction mixture; and (c) quantitatively determining the mole ratio of the carboxamide to the N-substituted carboxamide by comparing the relative outputs attributable to the carbonyl carbons of the carboxamide and the N-substituted carboxamide. In the foregoing process, the output is commonly displayed in the form of an amplitude versus frequency plot, hereinafter called "CMR spectrum" wherein the peaks attributable to the carboxamide and the N-substituted carboxamide are indicated. Accordingly, quantitative determination of the mole ratios of the carboxamide to N-substituted carboxamide is made by comparing the intensities of the peaks attributable to their respective carbonyl carbon peaks. In order to accurately measure conversion of carboxamide to the N-substituted carboxamide, it is preferred to improve the output signal-to-noise ratio by making repeated measurements by the foregoing procedure and to accumulate or total such measurements on a single CMR spectrum. In order to measure progress of the conversion of carboxamide to the N-substituted carboxamide derivative during the reaction, it is desirable to periodically analyze the reaction mixture by the foregoing procedure.

It is possible, by the practice of this invention, to accurately ascertain the degree of conversion of carboxamide to N-substituted carboxamide at any point during the reaction thereby enabling one to exercise almost total control over the quality of N-substituted carboxamide being formed. For example, one can rapidly ascertain the effect of a condition change upon the conversion of carboxamide to N-substituted carboxamide as well as its affect on the production of unwanted by-products by carrying out the improved process of the present invention. Surprisingly, by the practice of this invention, it is possible to quantitatively ascertain the mole ratio of carboxamide to N-substituted carboxamide by analyzing the reaction mixture without using a control sample having a known concentration of carboxamide and N-substituted carboxamide.

The improved process of the present invention is usefully employed in the conversion of carboxamide polymers such as polyacrylamide to their N-substituted derivatives as well as in the conversion of monomeric carboxamides to their N-substituted derivatives. As would be expected, the N-substituted derivatives of the carboxamide polymers are usefully employed in the flocculation of the dispersed particulate solids from aqueous suspensions, for example, sewage, effluents from paper manufacturing operations and industrial mining operations as well as paper drainage aids and dry strength additives.

DETAILED DESCRIPTION OF THE INVENTION

Carboxamides suitably employed in the practice of this invention are those organic compounds which contain one or more carboxamides corresponding to the following formula:

Of particular interest are the polymeric carboxamides such as polyacrylamide, polymethacrylamide and polymers of other ethylenically unsaturated amides as hereinafter described. Included within such polymeric carboxamides are copolymers of ethylenically unsaturated carboxamides with other ethylenically unsaturated monomers. Examples of such other ethylenically unsaturated monomers include α, β-ethylenically unsaturated carboxylic acids such as acrylic acid and methacrylic acid; esters of α, β-ethylenically unsaturated carboxylic acids such as methyl methacrylate, aminoethyl acrylate and aminoethyl methacrylate as well as sulfoethyl methacrylate; and other ethylenically unsaturated monomers.

Examples of monomeric carboxamides which are particularly suited to the practice of the present invention are those containing one or more ethylenically unsaturated groups which are conjugated or isolated in relation to one or more carboxamide groups. Of particular interest are the α, β-ethylenically unsaturated aliphatic monocarboxamides, especially those represented by the structural formula:

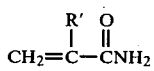

wherein R' is hydrogen, alkyl or cycloalkyl and R is as defined hereinbefore. Preferably, R' is hydrogen, methyl or ethyl. Exemplary preferred carboxamides include acrylamide, methacrylamide, ethacrylamide and the like, with acrylamide being most preferred. Herein, the term "carboxamide" includes monomeric as well as polymeric carboxamides. Such carboxamides are soluble in water under reaction conditions to be employed in preparing the N-substituted derivative, i.e., they will form at least a 5 weight percent aqueous solution.

For the purposes of this invention, the term "N-substituted carboxamide or N-substituted derivative" means a derivative of a carboxamide as defined hereinbefore wherein one hydrogen of the carboxamide moiety

is substituted with a monovalent aliphatic hydrocarbon moiety. Exemplary hyrocarbon moieties include alkyl and substituted alkyl wherein the substitutent is —OH, SO$_3$M wherein M is H or metal cation or —N(R')$_2$ wherein each R' is individually hydrogen, alkyl or hydroxyalkyl. Preferred aliphatic hydrocarbon moieties are aminoalkyl, especially dialkylaminoalkyl. Accordingly, the preferred N-substituted carboxamide is a N-(aminoalkyl)carboxamide, with the N-(dialkylaminomethyl)carboxamides such as those prepared by the Mannich reaction of carboxamide, e.g., acrylamide or polyacrylamide, with an aldehyde and a secondary amine being especially preferred. The especially preferred N-substituted carboxamides and methods for their preparation are described in detail hereinafter. It is understood, however, that the improved process of this invention is suitably employed in any other process for forming a N-substituted carboxamide exhibiting a carbonyl carbon-13 peak(s) at a frequency(ies) measurably different from that of the carbonyl carbon-13 peak(s) attributable to the carboxamide. Other N-substituted carboxamides of significant interest are N-(methylol)-carboxamides prepared by the reaction of formaldehyde with carboxamide and N-(sulfomethyl)carboxamides prepared by the reaction of sulfurous acid and formaldehyde with the carboxamide.

As used herein, the term "aldehyde" means aldehydes having 1 to 3 carbon atoms and materials which will generate such aldehydes under conditions of the process of this invention. Examples of aldehydes include formaldehyde, acetaldehyde and propionaldehyde, with formaldehyde being preferred. Examples of materials containing or having the capability of generating aldehydes, particularly formaldehyde, include paraformaldehyde, formalin, trioxymethane (often called trioxane), formals (e.g., CH$_3$OCH$_2$OCH$_3$) and hemiformals (e.g., HOCH$_2$OCH$_3$).

Amines employed in the preparation of N-(dialkylaminoalkyl)carboxamides are advantageously secondary amines which are soluble in aqueous liquid under the reaction conditions. Preferably, they are soluble in water, i.e., they will form at least a 5 weight percent aqueous solution. Of particular interest are the secondary amines represented by the structural formula:

wherein R''' is individually hydrocarbyl such as alkyl, cycloalkyl, alkynyl, aryl or arylalkyl or inertly substituted hydrocarbyls such as hydroxyalkyl, aminoalkyl, sulfoalkyl, wherein sulfo is in acid or salt form, carboxyalkyl, wherein carboxy is in acid or salt form, or cyanoalkyl. Alternatively, the R''' groups are collectively alkylene, alkynylene or other divalent hydrocarbon radicals or inertly substituted diradicals which, when taken with the amino nitrogen, form a heterocyclic ring, preferably having 5 or 6 members. A diradical, while predominantly hydrocarbon, may be alkylaminoalkyl, alkoxyalkyl, alkylthioalkyl and the like. By "inertly substituted" is meant that the substituent is inert in the reaction forming the N-(aminoalkyl)carboxamide (Mannich derivative). Hydrocarbyl, as used herein, is a monovalent hydrocarbon radical. Preferably, R''' is alkyl, especially lower alkyl having 1 to 8 carbon atoms, most preferably methyl. Exemplary amines include dimethylamine, methylethylamine, hydroxyethylmethylamine, dibutylamine, piperidine, morpholine, and the like with dimethylamine being most preferred.

Alternative to the amine, it is possible, although less preferred, to prepare by the process of this invention an anionic N-substituted derivative by employing sulfurous acid or its water-soluble salts, preferably the alkali metal salts of sulfurous acid. Generally, the most preferred salts used are sodium bisulfite and potassium bisulfite.

So long as the reaction of the carboxamide with N-substituting reagent is carried out under conditions sufficient to form the desired N-substituted carboxamide, the particular reaction conditions are not critical. Advantageously, the reaction is carried out in aqueous solution containing from about 8 to about 80 weight percent of the carboxamide and from about 4 to about 50 weight percent of N-substituting reagent(s). For example, when the N-substituting reagents are aldehyde and amine, the aqueous solution contains from about 4 to about 50 weight percent of aldehyde and from about 5 to about 20 weight percent of amine.

When reacting the carboxamide with aldehyde and amine or aldehyde and sulfurous acid or salt thereof, it is often desirable to prereact the amine with aldehyde or sulfurous acid or salt with aldehyde to form an adduct which is subsequently reacted with the carboxamide in aqueous medium. In such instances, the adduct is normally prepared by reacting an aqueous solution of aldehyde with suitable amine or sulfurous acid or salt thereof. While the reaction may take place at ambient or elevated temperatures, the reaction proceeds at a sufficiently rapid rate in most instances at ambient temperatures. The molar ratio of aldehyde to amine may vary over a wide range but the preferred ratio is usually within the range from about 10 to 1 to about 1 to 10, most preferably from 2 to 1 to 1 to 2. Correspondingly, the ratio of aldehyde to sulfurous acid or salt thereof is advantageously in the range from 10 to 1 to 1 to 10, most preferably in the range from 2 to 1 to 1 to 2. While it is generally desirable to prepare the foregoing adducts in as concentrated form as possible in order to minimize dilution effects, the concentration of the adduct in the aqueous medium should be from about 30 to about 60 weight percent, most preferably from about 38 to 53 weight percent. The amine contribution or the sulfurous acid contribution is calculated as if each were in free form even through salt form may actually exist.

In reacting the carboxamide with (1) aldehyde and amine or aldehyde and sulfurous acid or salt thereof or (2) aldehyde/amine adduct or aldehyde/sulfurous acid (salt) adduct, the aqueous reaction mixture is maintained at a pH from about 7 to about 14, preferably from about 8 to about 12 and most preferably from about 9 to about 11. In the case of unsaturated carboxamides, particularly acrylamide, it is desirable to carry out the reaction at a pH less than 7, preferably from about 0.02 to about 4 for acrylamide and most preferably from about 2 to about 4. The temperature of the reaction is not particularly critical and is suitably any temperature which provides the desired conversion to the N-substituted carboxamide. Generally, however, the reaction temperature ranges from about 20° to about 90° C., preferably from about 30° to about 60° C. While the reaction time required to achieve the desired conversion to N-substituted carboxamide will decrease as temperature increases, effective reaction normally occurs within 1 to about 4 hours at intermediate reaction temperatures of from about 40° to about 65° C. In any event, the reaction is continued for a period of time sufficient to convert the carboxamide to the desired N-substituted carboxamide.

For the purposes of this invention, it is understood that a reaction carried out in the form of a water-in-oil emulsion shall be considered a practice within the scope of this invention. In such practice, aqueous solutions of one or more of the reactants are dispersed in an oil phase usually with the aid of a water-in-oil emulsifier. The proportions of ingredients (i.e., oil phase, aqueous phase, emulsifier, etc.) in such practices are similar to those conventionally employed in water-in-oil polymerization of water-soluble monomers, e.g., as in U.S. Pat. No. 3,284,393, and water-in-oil carboxamide N-substitution reactions, e.g., U.S. Pat. No. 3,979,349. It is further understood that the reaction employed in the practice of this invention can be carried out by combining the reactants in neat form.

The practice of the improvement of the present invention comprises analyzing the reaction mixture at least once during the reaction after at least a measurable portion of N-substituted carboxamide is formed by using a nuclear magnetic resonance analytical method for the measurement of carbon-13, hereinafter called CMR. In the CMR spectrum for the reaction mixture containing the carboxamide and the N-substituted carboxamide thereof, peaks are observed which are due to a naturally occurring isotope of carbon (carbon-13 having a natural abundance of 1.1 percent). The peak position or chemical shift is sensitive to the magnetic environment, consequently, specific types of carbon atoms in the carboxamide and N-substituted carboxamide can be distinguished. Table I set forth hereinafter lists the CMR chemical shifts and spectral assignments for compounds employed in an exemplary reaction mixture. These compounds include a polymeric acrylamide, amide methylol, N-(dimethylaminomethyl)acrylamide and low molecular weight amine/formaldehyde adducts. The ability to distinguish between the primary amide carbonyl carbon of the carboxamide and the secondary amide carbonyl carbon of the N-substituted derivative is illustrated by the chemical shift for the carbonyl group of the carboxamide (180.3) and for the N-substituted derivative (178.0). In addition, secondary amide structures of the N-(aminomethyl) Mannich derivatives can be further resolved with the corresponding

methylene carbon peaks.

TABLE I

| | CMR Spectral Assignments | | | | |
| | Chemical Shift, ppm $\delta_{TMS}^{(a)}$ | | | | |
| | $CH_2$ | CH | CO | $NCH_2$ | $NCH_3$ |
|---|---|---|---|---|---|
| $(CH_2C(CONH_2)H)$ | 35.4 | 42.8 | 180.3 | | |
| $(CH_2C(CONHCH_2OH)H)_n$ | 36.0 | 43.0 | 178.5 | 64.0 | |
| $(CH_2C[CONHCH_2N(CH_3)_2]H)_n$ | 36.2 | 43.4 | 178.0 | 61.7 | 42.2 |
| $(CH_3)_2NH$ | | | | | 38.1 |
| $(CH_3)_2NCH_2OH$ | | | | 80.8 | 41.7 |
| $(CH_3)_2NCH_2N(CH_3)_2$ | | | | 83.3 | 44.0 |

$(a)$The CMR chemical shifts ($\delta$) are measured in units of the ratio of (1) the difference between the resonance frequency of a reference carbon (usually tetramethyl silane - TMS) and that of a given carbon to (2) the resonance frequency of the reference carbon $\times 10^6$ Hz. The foregoing chemical shifts are measured using a second reference, 1,4-dioxane, and given an assigned shift of 67.4 ppm $\delta_{TMS}$.

In the CMR analysis procedure used in the practice of this invention, the reaction mixture is first fed to a device (hereinafter called "test region") containing a means for producing and detecting conditions of nuclear magnetic resonance for carbon-13 nuclei present in the mixture. Subsequently, the conversion of carboxamide to N-substituted carboxamide is measured quantitatively by comparing relative outputs attributable to the carbonyl carbons of the carboxamide and N-substituted carboxamide.

In a preferred analysis procedure, the techniques of Fourier transform nuclear magnetic resonance (FTNMR) are employed wherein a fixed magnetic field operating typically in the range of from about 10 to about 40 kilogauss is used. High power radio frequency pulses are then repeatedly applied to the test region for short periods of time by means of a radio frequency generator to produce conditions of magnetic resonance for carbon-13 nuclei present in the reaction mixture. The subsequent return of these carbon-13 nuclei to a nuclear magnetic resonance state existence prior to the pulse is monitored over a time interval by means of a magnetic pickup located in the test region. As a result of such monitoring, an output is obtained which is indicative of the level of any disturbance of the magnetic field produced by the presence of various compounds (particularly carboxamide and N-substituted carboxamide) in the reaction mixture placed in the test region.

The frequency of the pulse is normally in the range characterized as radio frequency range, preferably in the range from about 10 to about 40 megahertz (MHz). By a high power pulse is meant a radio frequency pulse of the order of several gauss, e.g., from about 5 to about 50 gauss. The period of time for each pulse is preferably from about 1 to about 30 microseconds, especially from about 1 to about 10 microseconds.

The output monitored by the magnetic pickup is measured as an electrical quantity, e.g., in volts, containing, in the case of FTNMR, elements of both frequency and amplitude. This output is processed, usually by computer, to convert the output to a measure of the intensities of the carbonyl carbon peaks for the carboxamide and N-substituted carboxamide. Advantageously, this measure or value of the intensities of the carbon-13 nuclei present in the reaction mixture is received as a signal by a recording instrument which plots intensity of each carbon-13 nuclei of the various compounds present in the reaction mixture against frequency.

Conversion of carboxamide to a N-substituted carboxamide is measured quantitatively by comparing the intensities of the corresponding carbonyl carbon peaks of the carboxamide and N-substituted carboxamide. In general, these intensities are influenced by concentration, magnetic relaxation time and nuclear Overhauser enhancements. See J. H. Noggle and R. E. Schirmer, "The Nuclear Overhauser Affect, Chemical Application," Academic Press, New York (1971) and A. Carrington and A. D. McLachlan, "Introduction to Magnetic Resonance," Harper and Row, New York (1967), Chap. I, for discussion of nuclear Overhauser enhancements (NOE). It is found that the carbonyl peaks of the carboxamide and N-substituted carboxamide are affected to similar extents by magnetic relaxation time and NOE. Thus, accurate relative molar concentrations of the carboxamide and N-substituted carboxamide can be calculated from unmodified peak intensity data. This is illustrated in Table II wherein the molar composition of a reaction mixture containing theoretically equivalent molar amounts of polyacrylamide and the N-(dimethylaminomethyl) derivative thereof are listed for different decoupling conditions, e.g., with and without the NOE effect. These conversions agree to within an observed 3 percent relative error, demonstrating the essential equivalence of the NOE factors for these primary and secondary carbonyl carbons. The equivalence of the primary and secondary carbonyl carbon spin relaxation times to within 10 percent relative error is established by inversion recovery experiments at 25° C. as described in "The Mannich Reaction of Polyacrylamide", Macromolecules, Vol. 12, No. 2, p. 203 (1979). This equivalence of relaxation times is further evidenced by the fact that molar conversions obtained at pulse repetition rates of 0.33 second and of 30 seconds are equivalent as indicated in Table II.

TABLE II

CMR Conversion For Various NMR Conditions

| Decoupling | Pulse Interval, sec. | Calculated Molar Conver. (%) to Mannich Derivative | |
|---|---|---|---|
| | | Peak Height | Peak Area |
| yes | 0.33 | 52.9 | 53.5 |
| yes | 30.00 | 52.3 | 55.8 |
| no | 5.00 | 53.7 | 54.8 |

The following example is given to illustrate the operation of the present invention and should not be construed as limiting its scope.

A polyacrylamide is prepared by a free radical aqueous solution polymerization initiated by the redox pair, sodium bisulfite/sodium persulfate. Initiator components are simultaneously introduced into a 20 percent aqueous solution of acrylamide monomer which has been purged with nitrogen. After the exotherm of reaction has subsided, the reaction mixture is heated to 100° C. and then allowed to cool slowly to ambient temperature. The level of unreacted monomer left in the system is measured at less than 0.15 weight percent as determined by the bromate/bromide titration method disclosed in D. A. Skoog and D. M. West, "Fundamentals of Analytical Chemistry," Holt, Rinehart and Winston, Chicago, Ill. (1969), page 473 and T. J. Suen and D. F. Rossier, J. Appl. Polym. Chem., 3, 126 (1960). The molecular weight of the resulting polyacrylamide is controlled by initiator level to below 100,000 in order to permit working with a low viscosity solution of polymer having greater than 20 weight percent solids.

To a 3-necked, round bottom flask equipped with a thermometer, magnetic stirrer and a pH electrode are added 1 weight part of paraformaldehyde containing 96 percent of formaldehyde and 3.71 parts of a 40 percent aqueous solution of dimethylamine. The paraformaldehyde is added slowly to control the reaction temperature below 45° C. After a reaction time of two hours, the resulting formaldehyde/amine adduct is then acidified to a pH of 3 by slowing adding about 4 weight parts of a 30 weight percent aqueous solution of hydrochloric acid. During the addition of the hydrochloric acid, the reaction mixture is cooled with an ice bath to maintain the reaction mixture at a temperature below 20° C. The resulting acidified adduct is then added to 4.5 weight parts of a 50 weight percent aqueous solution of the polyacrylamide described hereinbefore which has previously been acidified with hydrochloric acid to a pH of 3. The resulting mixture is heated to 65° C. and maintained there with stirring for a period of two hours.

During the addition of the amine/formaldehyde adduct to the polyacrylamide solution and the subsequent reaction, samples of the reaction mixture were taken at one hour intervals and analyzed using CMR. The results of this analysis are reported in the following Table III.

TABLE III

| Sample No. | Reaction Time[1] Hrs. | CMR Measured[2] $CONH_2/CONHCH_2N(CH_3)_2$, molar % |
|---|---|---|
| 1 | 1 | 67 ± 2 |
| 2 | 3 | 79 ± 2 |

TABLE III-continued

| Sample No. | Reaction Time[1] Hrs. | CMR Measured[2] $CONH_2/CONHCH_2N(CH_3)_2$, molar % |
|---|---|---|
| 3 | 5 | 88 ± 2 |

[1]Reaction time in hours after initial addition of amine/aldehyde adduct to polyacrylamide solution.
[2]Molar ratio of polyacrylamide (carboxamide) to N-(dimethylaminomethyl) derivative (Mannich derivative) as determined by CMR. Fourier transform CMR spectra are obtained at 25.2 megahertz (MHz) using a Varian XL-100 NMR spectrometer equipped with a Digilab FTS/NMR3 data system and a Varian V-6040 variable temperature controller. During operation, the spectrometer is locked on an external fluorine - 19 signal ($C_6F_6$). Protons are decoupled with broad band radio frequency noise. Repetitive 30° pulse (8 microsecond width) applied at 250 Hz to the low frequency of tetramethylsilane (TMS) are used to generate the carbon-13 free induction signals, which are filtered (15 kHz single side band crystal, 6.2 kHz RC and 12 kHz Butterworth), digitized at a rate of 10,560 points/second (5280 Hz bandwidth), and accumulated in computer memory. After accumulation, the digitized data are weighted to enhance sensitivity by using an exponential apodizing function with a one second time constant. Then the data are fast Fourier transformed to provide absorption spectra. Pulse repetition rates of 1.29 reciprocal seconds (4096 points) and 2.56 reciprocal seconds (2048 points) are used. Samples are run as aqueous solutions in 12-mm precision NMR sample tubes. A consistent set of CMR chemical shifts is obtained by using p-dioxane as an interval reference having an assigned shift of 67.4 ppm δ relative to TMS.

What is claimed is:

1. In a process for converting an organic carboxamide containing one or more carboxamide moieties corresponding to the formula:

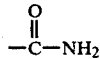

to an N-substituted carboxamide wherein one hydrogen of the carboxamide moieties is substituted with alkyl or substituted alkyl wherein the substituent is —OH, —$SO_3M$ wherein M is H or metal cation or —$N(R')_2$ wherein each R' is individually hydrogen, alkyl or hydroxyalkyl in which process a carboxamide is reacted by contacting it with N-substituting reagent(s), the improvement in which the reaction mixture comprising the carboxamide, N-substituting reagent and N-substituted carboxamide is, periodically during the process, analyzed for the presence of carbon-13 nuclei by:

(a) subjecting a reaction mixture which contains the carboxamide, N-substituting reagent(s) and N-substituted derivative in a nuclear magnetic spectrometer to a magnetic field and an electromagnetic field such that conditions of magnetic resonance are achieved for carbonyl carbon-13 nuclei in the reaction mixture;

(b) detecting an output which is an indication of the disturbance of said fields by the reaction mixture; and (e) quantitatively determining the mole ratio of the carboxamide to the N-substituted carboxamide by comparing the relative outputs attributable to the carbonyl carbons of the carboxamide and the N-substituted carboxamide.

2. The improvement of claim 1 wherein the reaction mixture is repeatedly subjected to conditions of step (a) with output level being determined as a total output from each application of step (a).

3. The improvement of claim 2 wherein the reaction is carried out in an aqueous solution and the concentration of carboxamide in the aqueous solution is in the range from about 8 to about 80 weight percent.

4. The improvement of claim 3 wherein the medium of the reaction is a water-in-oil emulsion.

5. The improvement of claim 3 wherein the carboxamide is acrylamide and the N-substituted carboxamide is N-(dialkylaminomethyl)acrylamide.

6. The improvement of claim 3 wherein the carboxamide is a polymer of acrylamide and the substituted alkyl is dialkylaminomethyl.

7. The improvement of claim 3 wherein the carboxamide is methacrylamide and the N-substituted carboxamide is N-(dialkylaminomethyl)methacrylamide.

8. The improvement of claim 5 wherein the N-substituted carboxamide is N-(dimethylaminomethyl)acrylamide.

9. The improvement of claim 8 wherein the N-substituting reagents are dimethylamine and formaldehyde.

10. The improvement of claim 3 wherein the substituted alkyl is hydroxyalkyl.

11. The improvement of claim 10 wherein the N-substituting reagent is formaldehyde.

* * * * *